July 29, 1952  H. J. McCREARY  2,605,343
AUTOMATIC RADIO WEATHER STATION
Filed June 8, 1949  2 SHEETS—SHEET 2

INVENTOR.
HAROLD J. McCREARY

BY

ATTORNEY

Patented July 29, 1952

2,605,343

UNITED STATES PATENT OFFICE 2,605,343

AUTOMATIC RADIO WEATHER STATION

Harold J. McCreary, Lombard, Ill., assignor to Automatic Electric Laboratories, Inc., Chicago, Ill., a corporation of Delaware Application June 8, 1949, Serial No. 97,834

13 Claims. (Cl. 177—380)

1

The present invention relates to automatic weather stations adapted for use in automatically transmitting at timed intervals to any desired point information regarding various atmospheric conditions occurring at a selected station, and more particularly to an electronic circuit to be used for translating meteorological information.

An object of this invention is to provide a novel automatic weather station.

Another object of this invention is to provide an automatic weather station which translates different resistance-type meteorological instruments into signals by means of sequential operations without any mechanical movement to provide the sequential operation.

A further object of this invention is to provide a method whereby a plurality of Thyratron tubes may be so connected that only one tube can fire in a prearranged time sequence, and the time intervals between the firing of the respective tubes being used for transmitting information.

The above-described objects of the invention will more fully appear from the following detailed description when the same is read in connection with the accompanying drawings. It is to be expressly understood, however, that the drawings are for the purpose of illustration, and is not intended as a definition of the limits of the invention.

Figure 1:
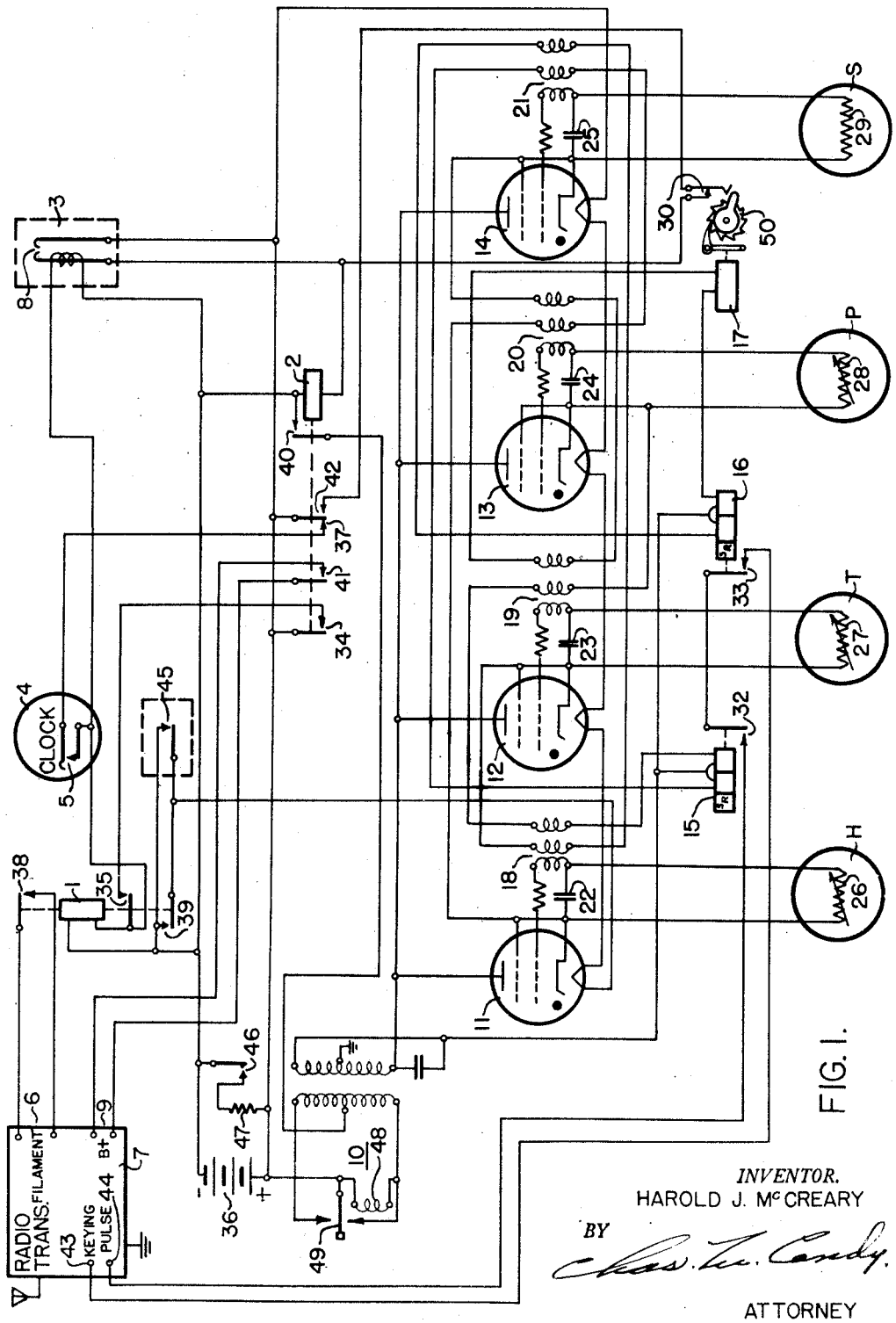

Fig. 1 of the drawings is a schematic representation of the novel meteorological transmitter of the present invention.

Figure 2:
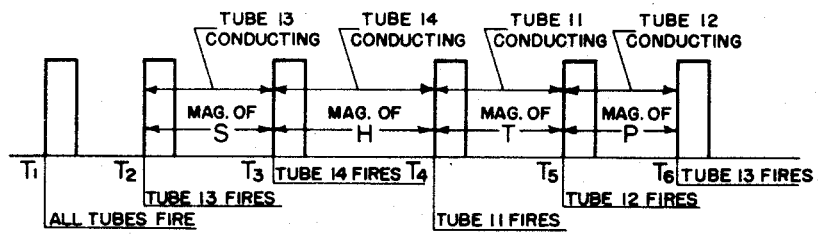

Fig. 2 is a diagram of the signal transmitted.

The novel meteorological transmitter of the present invention is a system which automatically controls a radio transmitter 7 to automatically transmit by radio weather information as indicated by three or more weather indicating instruments such as a thermometer T, barometer P and hydrometer H. This system is of the type that can be used in an unattended outpost station.

The above-mentioned meteorological instruments, which are well-known, are of the type disclosed in Patent No. 2,287,786 issued on August 30, 1941 to H. Diamond et al. They are effectively the type of meteorological instruments that affect an electrical circuit by varying the resistance thereof as atmospheric conditions change.

The readings of the above-mentioned instruments are translated in sequence into a succession of pulses caused by the firing of the Thyratron tubes 11, 12, 13 and 14. The time intervals between the initiation of the pulses is

2 a measurement of the magnitude of the resistors 26, 27 and 28, and thus of the corresponding instrument readings. The pulses emitted by the radio transmitter 7 may be recorded preferably by a tape recorder in a radio receiving station. The lengths of the time intervals between the initiation of pulses are taken from the tape with a pair of dividers with an adjustable ratio so that the magnitude of the instrument readings may be read directly from the scales provided. The method of identifying the instrument readings to the time intervals measured is by first identifying the standard value, which is a fixed resistance 29 and therefore a known time interval. Once the standard is identified, the readings of the subsequent instruments will appear in the following sequential order: humidity, temperature and pressure. The standard time interval will always follow the instrument P reading and always precede the instrument H reading.

The automatic weather station comprises a clock 4 which initiates the operation of the system at given time intervals. In response to the operation of the clock 4, a series of relays 1, 2 and 3 are operated to prepare the system for continuous operation. Before the continuous operation of the system takes place, thermal relay 3 permits a 20 second time delay for the application of filament voltage to radio transmitter 7, and Thyratron tubes 11, 12, 13 and 14. After the warm-up period, the vibrator power supply 10 generates A. C. voltage for the plates of the Thyratron tubes 11, 12, 13 and 14. Also, after the warm-up period, B+ voltage is supplied to the radio transmitter 7 by the power supply (not shown) of the radio transmitter 7. Following this operation there is a continuous sequential operation of the Thyratron tubes 11, 12, 13 and 14, which in effect is a chain operation. One tube will fire at a time. When one tube conducts, it renders the two tubes preceding it in the chain ineffective for conduction by causing a negative charge to bias the tubes beyond their cut-off potentials. However, the tube subsequent to the one conducting in the chain operation will fire when its negative charge discharges to a value below the cut-off potential. The tube conducting maintains a maximum negative charge on only two tubes of the chain, which are the preceding tubes in the order of operation. The tube operating subsequent to the one conducting will fire, since there is nothing maintaining a maximum negative charge on its grid. This activity continues in a similar manner for all tubes in the chain sequence, and the chain sequence continues until stopped by the stepping magnet 17 and ratchet cam arrangement 50. The time interval between the firing of the tubes is controlled by the respective R. C. time constant of the grid circuit of each tube. Since in all the grid circuits the condensers 22, 23, 24 and 25 have a fixed capacitance, the time interval variations will be caused by the variable resistors 26, 27 and 28, and the fixed resistor 29. The resistors 26, 27 and 28 are located in the meteorological instruments H, T and P. The resistor 29 is fixed and serves as a standard for comparing the setting of the instrument resistors 26, 27 and 28. The sequential firing of the Thyratron tubes 11, 12, 13 and 14 operate a set of slow-to-release relays 15 and 16, to pulse the radio transmitter. Since the tubes fire in a known sequence, the pulses emitted by the radio transmitter 7 enable the information of the weather factors to be evaluated by measuring the time interval between the initiation of pulses.

Included within this system is a stepping magnet 17 to terminate the continuous operation of this system after a given number of sequential operations have been completed. The stepping magnet 17 steps a ratchet cam 50 each time tube 14 extinguishes, since the ratchet steps on deenergization. After preferably ten steps the cam opens contact 30 to break the continuity of the system.

While this invention is described as applied to radio, it is quite obvious that it could be used for telemetering.

A fixed resistor 29 is used in this invention in a manner similar to that in which the variable resistor type meteorological instruments are used. The purpose of the fixed resistor is to provide a standard S for identifying the automatic weather station. The fixed resistor has other uses which will be apparent upon the reading of the detailed description.

The resistor 47 and contact 45 are used when the station is placed in a very cold climate. When the temperature gets below a predetermined value, contact 46 and contact 45 close. The effect of contact 46 closing is to put resistor 47 across the battery 36 so that battery 36 will not freeze when the station is not in operation. Likewise, if the temperature gets below a determined value, the oil from the clock will tend to solidify and the clock becomes inoperative. When that condition occurs, contact 45 will close and put filament voltage on the Thyratron tubes. In so doing enough heat will be generated to keep the clock in an operating condition.

Referring now to the single figure of the drawing for a more detailed description of the present invention. A clock 4, of conventional construction, is shown having a normally open contact 5 and is of the type wherein the contact 5 is automatically closed at regular time intervals. The clock 4 is of a standard design, and well-known in systems of this kind and is used to initiate the operation of the system at given time intervals without the aid of any attendant. The clock 4 may be arranged to initiate the operation of the system every eight hours by automatically closing the contact 5 when the time designated is reached. The contact 5 will remain closed for at least 30 seconds.

Vibrator power supply 10 is of a type well-known and generates an alternating current at a frequency preferably of 120 cycles per second. The type vibrator power supply herein used is preferably of the type used in automobiles which converts a direct current into an alternating current in a manner well-known in the art. Source of direct current used is the battery 36.

Radio transmitter 7 is also of standard design. The pulsing circuit for radio transmitter 7 is closed when both contacts 32 and 33 are closed by slow-to-release relays 15 and 16.

When the contact 5 closes, lock-up relay 1 is operated over the following circuit: negative side of the battery 36, winding of relay 1, contact 5, contact 37 and to the positive side of battery 36. Now that relay 1 is operated, contacts 38 close the filament circuit 6 of radio transmitter 7, and contacts 39 close the filament circuit of the Thyratron tubes 11, 12, 13 and 14. The circuit closed for the heating of the filaments of Thyratron tubes is as follows: negative side of battery 36, contacts 39, through the filaments of Thyratron tubes 11, 12, 13, 14 and the positive side of battery 36. Upon the closure of contact 35, relay 1 prepares its locking circuit in the following manner: negative side of battery 36, winding of relay 1, contact 35 and contact 34 and the positive side of battery 36. Relay 1 does not lock itself until relay 2 is operated. However relay 1 remains operated over the previously described circuit for 30 seconds, since contact 5 does not break until a period of 30 seconds has lapsed.

While the contacts 5 are closed, thermal relay 3 becomes heated and thereby closes contacts 8 after a time delay of 20 seconds. The circuit for heating relay 3 is as follows: negative side of battery 36, heating coil of relay 3, contacts 5, contacts 37 and positive side of battery 36. The above-described operation permits a sufficient time for warming up the radio transmitter 7 as well as the Thyratron tubes before continuous operation of the system.

The closing of contacts 8 of thermal relay 3 completes the circuit for the operation of lock-up relay 2 in the following manner: negative side of battery 36, winding of relay 2, contact 8, and positive side of battery 36. The operation of lock-up relay 2 closes contact 41 to operate the B+ power supply in radio transmitter 7. The operation of lock-up relay 2 opens contact 37 and closes contact 42. By opening the contact 37, the circuit leading to contact 5 is open. By closing contact 42, relay 2 prepares its locking circuit in the following manner: negative side of battery 36, winding of relay 2, contacts 30, contacts 42, positive side of battery 36. Contact 30 is opened until ratchet cam 50 takes its first step. The opening of contact 37 also opened the circuit to the heating coil of relay 3. After the thermal relay 3 sufficiently cools off contact 8 is opened, which is a lapse of 20 seconds after contact 37 breaks. Therefore, relay 2 remains operated for the time period it takes for contact 8 to break. Contacts 34 close to complete a locking circuit for relay 1 over a previously described path.

The operation of lock-up relay 2 also closes contact 40. Contact 40 completes the circuit for the operation of vibrator power supply 10 in the following manner: negative side of the battery 36, contact 40, the center tap of the transformer included within vibrator power supply 10, magnet 48 and to the positive side of battery 36. A vibrator reed 49 is provided with contacts connected in the circuit in such a manner that the battery voltage is first applied across one-half of the primary winding of the transformer, and then in the opposite direction across the other half of the transformer. The reed 49 is kept in vibration at its frequency of mechanical resonance by the magnet 48, which is so arranged that when the reed is drawn to the magnet 48, the terminals of the latter are short-circuited and the reed is allowed to spring back. The vibrator power supply 10, an A. C. generator, supplies the plate voltage for Thyratron tubes 11, 12, 13 and 14.

At the outset, Thyratron tubes 11, 12, 13 and 14 will fire when the first positive half cycle of voltage is impressed upon the plates of the tubes. Since the plates of the Thyratron tubes are connected in parallel, the voltages impressed upon the plates of the respective Thyratron tubes 11, 12, 13 and 14 are in phase with one another. The Thyratron tubes 11, 12, 13 and 14, are conducting and instantaneously current flows through their respective transformer windings 18, 19, 20 and 21 and induces a voltage to charge the condensers 22, 23, 24 and 25 so that the potentials upon the grids of the tubes are 180° out of phase with respect to the plates. In a short time after all the tubes fire, the current flowing through the transformer windings 18, 19, 20 and 21 will induce a voltage to charge their respective condensers 22, 23, 24 and 25 so as to bias the grids of the tubes beyond the cut-off potential. After the condensers charged to a cut-off potential, the tubes will cease firing when the subsequent negative half cycle of voltage is impressed upon the anodes. When the tubes are extinguished, instantaneously, all of the grid condensers will start to discharge through their associated resistors 26, 27, 28 and 29. The grid circuit with the smallest R. C. time constant will reach the cut-off potential first. It is to be noted that a number of cycles of alternating current were impressed on the plates of the tubes during the discharge time. When the tubes fired at the outset, relays 15 and 16 were operated over paths hereinafter described in detail. Therefore, contacts 32 and 33 closed to complete the circuit to pulse transmitter 7 over the following path: terminal 43, contact 33, contact 32 and terminal 44. This first pulse from the transmitter 7 is a signal to the receiving station to prepare for recording the meterological data. Both relays 15 and 16 release when all tubes are biased to cut-off potential.

At the outset, tube 14 also fired and in so doing stepping magnet 17 was operated over the following path: plate of tube 14, secondary winding of transformer located within power supply 10, right-hand relay winding of relay 16, stepping magnet 17, transformer 19, transformer 20, and cathode of tube 14. When tube 14 extinguished, magnet 17 released and ratchet cam 50 makes the first step upon deenergization.

It will be noted that ratchet cam 50 engages contacts 30 to stop the sequential operation. Therefore, when the continuous operation is stopped, which hereinafter is described in detail, the ratchet cam 50 remains engaging contacts 30 and when this first step is made ratchet cam 50 disengages contacts 30 to enable the system to have continuous operation. When contact 30 is made, the locking circuit is completed for relay 2 over a previously described path. The contact 30 is closed within 20 seconds after contact 37 breaks.

Since the circuit is symmetrical with respect to all the Thyratron tubes, and assuming that the negative charge on the grid of tube 13 from the condenser 24 discharges first through the resistor 28. Tube 13 will conduct when the grid bias discharges to a value below the cut-off potential and when the positive half cycle is impressed on the plate of the tube. Current will flow from the plate of tube 13, through the power supply, through the right-hand winding of relay 15, transformer 18, transformer 19, and back to the cathode of tube 13. When current flows through transformers 18 and 19, the voltage induced will cause the grid condensers 22 and 23 of tubes 11 and 12 to take on a maximum negative charge. Therefore, as long as tube 13 conducts, tubes 11 and 12 are prevented from firing.

Slow-to-release relay 15 is now operated over the above-traced circuit and contact 32 is closed. Tube 14 will fire subsequent to the firing of tube 13, since tube 13 in no way affects the firing of tube 14. The firing time of tube 14 depends upon the R. C. time constant of condenser 25 and resistor 29. At the beginning of the operation the grid condenser 25 was charged as previously described, and the time that tube 14 strikes depends upon the time duration that it takes for the grid bias of tube 14 to discharge to a value below the cut-off potential.

When the tube 14 fires, it immediately stops tube 13 from conducting and also prevents tube 12 from conducting. When tube 14 conducts, current flows from the plate of tube 14, through the power supply 10, right-hand winding of relay 16, winding of step magnet 17, transformer 19, transformer 20 and to the cathode of tube 14. Current flowing through stepping magnet 17 caused the ratchet cam to take a step upon deenergization. The induced voltage from the transformers 19 and 20 put a maximum negative charge on the grids of tubes 12 and 13. Therefore, during the time interval that tube 14 conducts, tubes 12 and 13 cannot fire. The current flow through relay 16 operated the slow-to-release relay 16 and the contact 33 is closed. Since contact 32 is already closed, a circuit to pulse the radio transmitter is completed in the following manner: terminal 43, contact 33, contact 32, terminal 44 and radio transmitter 7. Therefore, a pulse is emitted from the radio transmitter 7. Following this period relay 15 becomes deenergized and contacts 32 open, since tube 13 is no longer conducting.

When tube 14 fired and stopped conduction in tube 13, the current flow to the cathode of tube 13 through transformer 18 stopped. With no current through transformer 18, the maximum charge is no longer maintained on the condenser 22 of the grid of tube 11, and therefore the charge on its grid condenser starts to leak through the resistor 26. When the charge on condenser 22 has leaked out through resistor 26 so that the potential of the grid of tube 11 gets below the cut-off potential, tube 11 will fire.

When tube 11 fires, current flows from the plate of tube 11, through the power supply 10, left-hand winding of relay 15, transformer 21, transformer 20, and to the cathode of tube 11. Slow-to-release relay 15 is now operated, and contact 32 is closed. During this period contact 33 remained closed, and the transmitter is pulsed in the following manner: terminal 43, contact 33, contact 32, terminal 44, and radio transmitter 7. The pulsing of radio transmitter 7 emits a pulse in the well-known manner. The time duration between the initiation of the last pulse and the initiation of the present pulse is the measurement of the value of resistor 26 of the meteorological instrument H. The firing time interval between the firing of tube 14 and tube 11 is also a measurement of the value of resistor 26. Relay 16 becomes deenergized and contact 33 opens, since tube 14 is no longer conducting.

When tube 11 fires, its cathode draws current through transformers 20 and 21, as previously described, and therefore maintains negative grid potential on tubes 13 and 14 so that these tubes cannot conduct. When tube 14 became nonconductive, no current flowed from transformer 19 to the cathode of tube 12. Therefore, the negative potential on the grid of tube 12 is no longer maintained by means of transformer 19. The potential on the grid of tube 12 from charged condenser 23 starts to drop through resistor 27 and when the potential gets below the cut-off value, tube 12 will fire. The time interval that it takes for tube 12 to fire depends upon the R. C. time constant of resistor 27 and grid condenser 23. It is to be noted in all instances involving the R. C. time constant that the capacitance is a fixed value, while the value of the resistor varies.

When tube 12 conducts, current flows from the plate of tube 12, through the power supply 10, left-hand winding relay 16, transformer 21, transformer 18 and to the cathode of tube 12. Slow-to-release relay 16 is now operated and contact 33 is closed. Since relay 15 is also slow-to-release, the pulsing circuit for transmitter 7 is completed through a previously described path. The time interval between the initiation of the previous pulse and the present pulse is the measurement of the value of resistor 27 of meteorological instrument T. The firing time interval between tube 11 and tube 12 is also a measurement of the value of resistor 27. Subsequently, relay 15 deenergizes and contact 32 opens, since tube 11 extinguishes.

When the potential of condenser 23 reached the cut-off point of tube 12, tube 12 fired drawing current through transformers 18 and 21. Thereby, a negative potential is set up at the grids of tubes 11 and 14 so that these tubes no longer conduct.

When the tube 11 becomes non-conductive, no current flows through the transformer 20. Therefore, the negative potential on the grid of tube 13 is no longer maintained by means of transformer 20. The potential on charged condenser 24 starts to drop and arrives at the cut-off potential of the grid of tube 13 at a subsequent time depending upon the R. C. time constant of resistance 28 and condenser 24. The time interval between the firing of tubes 12 and 13 is a measurement of the value of resistor 28.

When tube 13 conducts, current flows from the plate of tube 13, through the power supply 10, right-hand winding of relay 15, transformer 18, transformer 19, cathode of tube 13.

Relay 15 is now operated and contact 32 is closed. Contact 33 is closed, since relay 16 is a slow-to-release relay. Transmitter 7 is pulsed in a manner previously described. The time interval between the initiation of the present pulse and the initiation of the last pulse is a measurement of the magnitude of resistor 28. Subsequently, relay 16 is deenergized and contact 33 opens, since tube 12 is no longer conducting.

Tube 13 is conducting and therefore, current flows through the transformers 18 and 19 as described above. Currents flowing through the transformers 18 and 19 sets a negative potential at the grids of tubes 11 and 12 so that these tubes do not conduct. When tube 12 becomes non-conductive no current will flow through transformer 21, and therefore the potential on grid of tube 14 starts to drop. After a predetermined time interval depending upon the time constant of resistor 29 and condenser 25, the potential on the grid of tube 14 will reach the cut-off potential value. At that time tube 14 will fire. The time interval between the firing of tube 13 and tube 14 is a measurement of the value of resistor 29.

When tube 14 conducts, current flows from the plate of tube 14, through the power supply 10, right-hand winding of relay 16, stepping magnet 17, transformer 19, transformer 20, and to the cathode of tube 14. Relay 16 operates and contacts 33 are closed. Closing of contacts 33 completes the circuit for pulsing transmitter 7 in a manner previously described. The time interval between the initiation of the present pulse and the initiation of the last pulse is the measurement of the magnitude of resistor 29 of the standard S.

This cycle of events could continue indefinitely. However, in series with the cathode circuit of tube 14 is a stepping magnet 17 and ratchet cam 50, which after a specific number of energizations open contacts 30. Contacts 30 open the locking circuit of relay 2 over a previously traced path. Relay 2 releases and contact 34 breaks to open the locking circuit of relay 1 over a previously traced path. Upon deenergization of relay 2, contact 41 opens the circuit of the B+ power supply in radio transmitter 7; contact 40 opens the circuit to the vibrator power supply 10, contact 37 closes to prepare the system for future operation, and contact 42 further opens the self-locking circuit of relay 2. Upon the deenergization of relay 1, contact 38 opens the filament circuit of radio transmitter 7; contact 39 opens the filament circuit of Thyratron tubes 11, 12, 13 and 14; and contact 35 opens the locking circuit of relay 1. Tube 14 extinguishes when there is no B+ voltage and therefore relay 16 releases to allow contact 33 to fall back. All the elements of the system are now in their normal position, and are prepared for operation at the next selected time when clock contacts 5 again close.

From the description, it should now be clear that tubes 11, 12, 13 and 14 become conductive one at a time in a given sequence. Also, that the time interval between conduction of any two tubes in the sequence is a measurement of a meteorological instrument. When the pulses emitted by the radio transmitter are recorded, the reading of the meteorological instrument is the time interval between the initiation of pulses in the sequence in which they occur.

It is to be noted that throughout the discussion that in tracing the paths of current flow from the plate of the respective tubes to the cathode that only one winding of the relays 15 and 14 were used at a particular time. If the other winding is traced, it leads to a non-conducting tube, which in effect is an open circuit, and therefore has no effect on the operation of the system at that particular moment.

A graphical analysis of the operation of the present invention is shown in Fig. 2 which illustrates the time intervals which are measured to designate the relative magnitude of the various meteorological instruments. The ordinate axis represents the pulse emitted by the transmitter 7, and the abscissa axis represents the time intervals in their sequential order. It is to be noted that the lengths of the pulses are determined by the release time of the slow-to-release relays 15 and 16.

While there has been described what is at present considered to be the preferred embodiment of the invention, it will be understood that various changes may be made therein, and it is contemplated in the appended claims, to cover all such changes as fall within the true spirit and scope of the invention:

I claim:

1. In an electronic transmitter, a plurality of thermionic tubes, each of said tubes having an anode and a control grid, a source of alternating current, means for connecting said source to the anode of each of said tubes, circuit means effective in response to the application of the first positive half-cycle from said source for simultaneously firing all said tubes, a condenser individually connected to the grid of each of said tubes, a circuit coupling chain interconnecting said tubes responsive to the firing of said tubes for charging all of said condensers, circuit connections effective in response to the charging of said condensers for biasing said tubes to disable the firing of said tubes on succeeding positive half-cycles from said source, a variable resistor individual to and connected in bridge of each of said condensers for discharging said condensers to remove said bias, the first one of said condensers to be discharged removing the bias from its individual one of said tubes to enable said one tube to fire, and cyclic means including successive portions of said circuit coupling chain effective successively after the firing of said first tube for successively recharging only predetermined ones of said condensers in a predetermined order and for successively firing said tubes in a predetermined order in response to the successive discharge of said condensers and removal of the bias from successive tubes.

2. In an electronic sender, a plurality of thermionic tubes each having an anode, a grid and a grid control circuit therefor, a cyclic chain circuit interconnecting said tubes for firing said tubes in a predetermined successive order and in successive cycles of operations, said chain circuit comprising a control circuit individual to each of said tubes and each said individual control circuit connected to its individual grid, inductive coupling means inductively coupling each said individual control circuit to the grid circuits of the remaining tubes except the successive tube in said chain for biasing said remaining tubes to cut-off potential, a source of alternating current, means for connecting said source to the anode of said tubes to simultaneously fire all of said tubes and subsequently disable said tubes, the firing of each tube activating its individual control circuit to bias its inductively coupled grid circuits to cut-off potential for rendering such tubes non-conductive, time delay means connected to each grid circuit for dissipating the bias thereon to enable said tubes to fire and the first tube to fire again after dissipation of its bias initiating the sequential firing of said tubes in said predetermined successive order under control of said individual control circuits, said time delay means and said source of current, and transmitting means controlled in accordance with the firing of said tubes.

3. In an electronic sender, a plurality of thermionic tubes each having an anode, a grid and a grid control circuit therefor, a source of alternating current, means for connecting said source to the anodes of said tubes to fire said tubes, a cyclic chain circuit interconnecting said tubes for firing said tubes in a predetermined successive order and in successive cycles of operations, said chain circuit comprising a control circuit individual to each tube and each said individual control circuit connected to its individual grid, inductive coupling means included within said cyclic chain circuit and connected individually to the cathode of one of said tubes for inductively coupling each of said individual control circuit of the remaining tubes except the succeeding tube in said chain for biasing said remaining tubes to cut-off potential to render such tubes non-conductive, time delay means connected to each control circuit for dissipating the bias thereon to enable said tubes to fire, and the first tube to fire after dissipation of its bias initiating the sequential firing of said tubes in said predetermined successive order under control of said individual control circuits, said time delay means and said source of potential, and transmitting means controlled in accordance with the firing of said tubes.

4. In an automatic weather reporting system, a plurality of meteorological instruments each having a variable resistor adapted to change its resistance value in response to meteorological changes, a thermionic tube individual to each resistor and having an anode, a grid and a grid control circuit for each tube including its resistors, a source of current, means for connecting said source to the anodes of said tubes to fire said tubes, means including inductive coupling circuits coupled to said grid control circuits and controlled by the firing of said tubes for sequentially firing said tubes in a predetermined successive order and in cyclic operations in response to the application of said source to the anode of said tubes, and time delay means including a condenser included in each grid control circuit and connected in bridge of its corresponding variable resistor for determining the time interval between successive firing of said tubes by said source in accordance with the resistance in said variable resistors.

5. In a meteorological transmitter, a plurality of thermionic tubes; means for operating said thermionic tubes; a plurality of electrical circuits each comprising a transformer and a condenser interconnecting said thermionic tubes to bias said tubes beyond their cut-off potential, said plurality of circuits providing a sequential operation of said thermionic tubes and allowing only one of said thermionic tubes to conduct at one time; a plurality of meteorological instruments, each of said meteorological instruments comprising a variable resistor and each of said resistors controlling the striking time of its associated thermionic tube by controlling the discharge time of said electrical circuits; and transmitting means transmitting pulses in response to the firing of said thermionic tubes, the intervals between pulses depending upon the resistance of the variable resistors.

6. In a meteorological transmitter, a timing device; a plurality of thermionic tubes; means for operating said thermionic tubes in response to said timing device; a plurality of electrical circuits each comprising a transformer and condenser interconnecting said thermionic tubes to bias certain of said tubes beyond their cut-off potential to provide a sequential operation of said thermionic tubes and to allow only one of said thermionic tubes to conduct at one time; a plurality of meteorological instruments each of which includes a variable resistor which controls the striking time of an associated thermionic tube by controlling the discharge time of certain of said electrical circuits; a standard instrument comprising a fixed resistor for controlling the striking time of one of said thermionic tubes by controlling the discharge time of one of said electrical circuits to provide a means for identifying said meteorological instruments and to provide a means for measuring the striking time interval of the thermionic tube firing subsequent thereto; and a transmitting means transmitting pulses in response to the firing of said tubes, said internals depending upon the condition of said meteorological instruments.

7. In an automatic weather station, a plurality of meteorological indicating means comprising variable resistors, a standard indicator comprising a fixed resistor used as a standard and identifying means, a plurality of thermionic tubes, cyclic chain circuits comprising inductive couplings, condensers and said resistors interconnecting said tubes for sequentially firing said thermionic tubes at variable time intervals in accordance with the resistance of said resistors in said meteorological means and said standard indicator, and a signalling means transmitting pulses in response to operation of said thermionic tubes, the time intervals between the initiation of said pulses being dependent upon the intervals between the firing of said tubes.

8. In an automatic weather station, a plurality of meteorological indicating means, a plurality of thermionic tubes, means for firing said tubes, circuits comprising transformers and condensers interconnecting said indicating means and said tubes controlled by the operation of said tubes to bias certain of said thermionic tubes beyond cut-off potential, circuits interconnecting said last means to successive tubes to provide for sequentially firing of said thermionic tubes at variable time intervals in accordance with the value of said meteorological indicating means, signalling means controlled by the sequential operation of said tubes to provide pulsing in response to operation of said thermionic tubes so as to enable the determination of the value of said meteorological indicating means by enabling the measurement of time intervals between initiation of pulses, and a relay means operated in response to the operation of one of said tubes to stop the operation of said thermionic tubes and said signalling means after certain number of sequential operations of said thermionic tubes.

9. In an electronic transmitter, a plurality of thermionic tubes, each of said tubes having an anode and a control grid, a source of alternating current, a circuit connecting said source of alternating current to the anode of each of said tubes to cause said tubes to conduct during the positive half cycle of said source and to render said tubes non-conducting in response to the application of the negative half cycle of said source, a time delay circuit connected to the control grid of each of said tubes for controlling the striking time of the tube connected therewith, a circuit coupling chain connected to said tubes responsive to the firing of said tubes for providing a biasing voltage for said tubes by charging said time delay circuits, and cyclic means including successive portions of said circuit coupling chain effective after the firing of one of said tubes for successively recharging only predetermined ones of said time delay circuits in a predetermined order to provide for successive firing of said tubes in a predetermined cyclic order in response to the successive discharging of said time delay circuits by removing the bias from successive tubes.

10. In an electronic sender, a plurality of thermionic tubes, each of said tubes having an anode and a control grid, a source of potential, means for connecting said source to the anode of each of said tubes to control the conduction of said tubes, a control circuit individually connected to the control grid of each of said tubes, an inductive coupling means responsive to the conduction of one of said tubes for charging the control circuits of the remaining tubes except the succeeding tube, said control circuit charging thereby biasing said remaining tubes to cut-off potential to render such tubes non-conductive, a time delay means included in said control circuits for dissipating the bias from successive tubes to enable said tubes to conduct, a cyclic chain circuit comprising said inductive coupling means, said source of potential, said control circuits and said time delay circuits, said cyclic chain interconnecting said tubes in such a manner as to enable one of said tubes to conduct at a time the condition of said one tube rendering the preceding tubes non-conducting, but enabling the succeeding tube to conduct thereby providing the cyclic operation.

11. In an electric sender, a plurality of thermionic tubes, each of said tubes having an anode, and a control grid, a source of alternating current, a circuit connecting said source of alternating current to the anode of each of said tubes to cause said tube to conduct during the positive half cycle of said source and to render said tubes non-conducting in response to the application of the negative half cycle of said source, a control circuit individually connected to the control grid of each of said tubes, an inductive coupling circuit responsive to the conduction of one of said tubes for charging the control circuits of the remaining tubes except the succeeding tube, said control circuits biasing said remaining charged tubes to cut-off potential rendering said remaining tubes non-conductive, a time delay means included in each said control circuit for dissipating the bias therein to enable said tubes to conduct, a cyclic chain circuit comprising said inductive coupling means, said source of potential, said control circuits and said time delay circuits, said chain circuit interconnecting said tubes in such a manner as to enable one of said tubes to conduct at a time, the conduction of said one tube rendering the preceding tubes non-conducting, but enabling the succeeding tube to conduct thereby providing the cyclic operation.

12. In an automatic weather reporting system, a plurality of meteorological instruments each having a variable resistor adapted to change its resistance value in response to meteorological changes, a thermionic tube individual to each resistor and having an anode and a grid, a source of alternating current, means for connecting said source to the anode of each of said tubes to fire said tubes, a grid control circuit for each tube connected to the grid of each tube, an inductive coupling circuit coupled to said grid control circuits and controlled by the firing of said tubes for sequentially firing said tubes in a predetermined successive order and in cyclic operations in response to the connection of said source to said tubes, and a time delay means including a condenser in each grid control circuit and connected in bridge of its corresponding variable resistor for determining the time duration between successive firing of said tubes by said source in accordance with the resistance of said variable resistors.

13. In an automatic weather station, a plurality of meteorological indicating means, a plurality of thermionic tubes, a timing device, circuits controlled by the operation of said timing device to initiate the operation of said thermionic tubes at given time intervals, means for operating said tubes, cyclic chain circuits comprising transformers and condensers interconnecting said indicating means and said tubes for biasing certain of said tubes beyond cut-off potential, circuits interconnecting said cyclic chain circuits and successive tubes to provide sequential firing of said tubes at variable time intervals in accordance with the value of said meteorological indicating means, signalling means operated in response to the operation of said thermionic tubes to provide pulsing so as to enable the determination of the value of said meteorological indicating means, and relay means controlled by the operation of one of said tubes to stop the operation of said thermionic tubes and said signalling means after a certain number of sequential operation of said thermionic tubes.

HAROLD J. McCREARY.

REFERENCES CITED

The following references are of record in the file of this patent:

UNITED STATES PATENTS

| Number | Name | Date |
| --- | --- | --- |
| 2,287,786 | Diamond | June 30, 1942 |
| 2,381,009 | Siderman | Aug. 7, 1945 |
| 2,404,565 | Bumstead | July 23, 1946 |
| 2,411,441 | Leroy et al. | Nov. 19, 1946 |
| 2,430,983 | Hoover, Jr. | Nov. 18, 1947 |
| 2,457,819 | Hoeppner | Jan. 4, 1949 |
| 2,468,703 | Haminel | Apr. 26, 1949 |
| 2,497,411 | Krumhansl | Feb. 14, 1950 |